United States Patent [19]

Rigsby et al.

[11] Patent Number: 5,430,689
[45] Date of Patent: * Jul. 4, 1995

[54] METHOD FOR ACQUIRING MARINE SEISMIC DATA HAVING STATISTICALLY DISTRIBUTED AZIMUTHS AND OFFSETS

[75] Inventors: Peter G. Rigsby; Gerald J. Henderson; James A. Musser, all of Plano, Tex.

[73] Assignee: Atlantic Richfield Company, Los Angeles, Calif.

[ * ] Notice: The portion of the term of this patent subsequent to Nov. 13, 2007 has been disclaimed.

[21] Appl. No.: 725,832

[22] Filed: Jul. 3, 1991

[51] Int. Cl.$^6$ ............................................. G01V 1/38
[52] U.S. Cl. .......................................... 367/15; 367/56
[58] Field of Search ........................ 367/15, 56, 58; 181/110

[56] References Cited

U.S. PATENT DOCUMENTS

| | | | |
|---|---|---|---|
| 3,431,999 | 3/1969 | Glazier | 181/5 |
| 3,753,222 | 8/1973 | Trostle | 340/15.5 |
| 4,001,770 | 1/1977 | Hofer | 340/15.5 |
| 4,403,312 | 9/1983 | Thomason | 367/56 |
| 4,476,552 | 10/1984 | Waters et al. | 367/56 |
| 4,677,598 | 6/1987 | Johnson | 367/56 |
| 4,930,110 | 5/1990 | Bremmer et al. | 367/56 |
| 4,933,912 | 6/1990 | Gallagher | 367/59 |
| 4,970,696 | 11/1990 | Crews et al. | 367/15 |
| 5,029,145 | 7/1991 | Marsden et al. | 367/56 |

FOREIGN PATENT DOCUMENTS 1232349  2/1988  Canada ..................... 349/9

OTHER PUBLICATIONS

Bukovies et al., "Combining Techniques in Integrated 3D Land, Shallow Water & Deep Channel Seismic Acquistion", *First Breck,* vol. 8, #10, Oct. 1990.

Crews et al., "Applications of New Recording Systems to 3-D Survey Designs", Expanded Abstracts with Biographics, 1989 Technical Program, 59th Annual International SEG Meeting, Paper SA 1.6.

Krey, "Attenuation of Random Noise by 2-D and 3-D CDP Stacking and Kirchoff Migration", Geophysical Prospecting, 35, (1987), pp. 135-147.

Musser, et al., "Applications of New Seismic Acquisition Technology to Land 3-D Surveys", Implementation, pp. 628-631.

*Primary Examiner*—Ian J. Lobo
*Attorney, Agent, or Firm*—Vinson & Elkins

[57] ABSTRACT

A method of performing a marine seismic survey is disclosed Seismic receivers, either hydrophones or geophones, are deployed in a set of parallel lines in the survey area. The acoustic energy is generated from a conventional marine seismic source towed by a vessel traveling in paths which are substantially perpendicular to the lines of receiver stations. The paths may pass over the lines of receiver stations, and may also pass outside of the receiver area. Alternative embodiments are disclosed which include sequencing of multiple sets of receiver station lines with one another, so that shots fired along different segments of the path correspond to the different sets of receiver stations. In addition, multiple sources may be towed and alternatively fired, to improve the survey efficiency.

17 Claims, 9 Drawing Sheets

+ SOURCE LOCATIONS   ○ RECEIVER LOCATIONS

*FIG. 3a*

+ SOURCE LOCATIONS   o RECEIVER LOCATIONS

+ SOURCE LOCATIONS    ○ RECEIVER LOCATIONS

+ SOURCE LOCATIONS    ∘ RECEIVER LOCATIONS

METHOD FOR ACQUIRING MARINE SEISMIC DATA HAVING STATISTICALLY DISTRIBUTED AZIMUTHS AND OFFSETS

This application is related to application Ser. No. 697,637, now U.S. Pat. No. 5,113,377 and application Ser. No. 697,573, now U.S. Pat. No. 5,257,241 both filed May 8, 1991 and both assigned to Atlantic Richfield Company.

This invention is in the field of geological surveying, and is more specifically directed to the acquisition of seismic data from marine environments for surveys of the three-dimensional type.

BACKGROUND OF THE INVENTION

Reflection seismology is a well-known technique for prospecting for sub-surface oil and gas reservoirs, both on land and in marine environments. As is fundamental in this technique, acoustic waves are imparted into the earth, generally by activation of a seismic source. Acoustic receivers detect the acoustic waves after their reflection from sub-surface strata and interfaces. Analysis of the source-receiver travel time of the acoustic waves, together with the known position of the source and receiver and the known acoustic wave velocity, provides an indication of the depth of the point of reflection at a location below the surface in the region between the source and receiver. As is well known in the art, sub-surface acoustically reflecting interfaces often correspond to the location of an oil or gas reservoir.

As is well known in this field, the depths of a reflecting sub-surface strata, taken at many points in a survey area, are necessary in order to generate a sufficiently accurate survey upon which drilling can be done. In addition, conventional seismic analysis techniques "stack" multiple traces of acoustic amplitude versus time for midpoints within a certain vicinity of the same location (such vicinity generally referred to as the "bin"), reinforcing the "signal" portion of the traces while the random acoustic "noise" tends to cancel out. As is well known, it is preferable that the multiple stacked traces for a given bin correspond to varying source-receiver offset distances, with normal move-out ("NMO") or dip move-out ("DMO") operations adjusting for the difference in travel time versus offset for a particular midpoint. Such stacking, or gathering, of trace data is conventionally referred to as common depth point ("CDP") or common midpoint ("CMP") stacking, with the number of traces for a given bin generally referred to as the "fold" of the survey for that bin.

Many conventional surveys are performed in the so-called two-dimensional (2-D) manner. 2-D land surveys are generally performed by deploying the acoustic receivers in a line and by activating the seismic source at locations collinear with, or offset from but parallel to, the line of receivers. In marine environments, 2-D surveys are generally performed by a vessel which is towing a source, such as an air gun, followed by a streamer of hydrophones. Other types of 2-D marine surveys use bottom-fixed receivers in combination with a towed source. As is apparent to those in the art, each 2-D survey is assumed to provide survey information relative only to a vertical plane into the earth. Surveying an area of the earth using these prior techniques requires multiple parallel 2-D surveys; an example of this technique is described in Canadian Patent No. 1 232 349, issued Feb. 2, 1988.

The surveying of an area by way of multiple parallel 2-D surveys has been referred to in the art as "3-D" seismic surveys, as a map of sub-surface geology over a surface region of the earth is generated. However, this type of survey is not truly "3-D", as information is acquired only at two source-receiver angles, or azimuths, with these two azimuths at a 180° angle relative to each other. In particular, certain sub-surface formations of importance from the hydrocarbon prospecting standpoint may not be appropriately imaged in a survey made up of parallel 2-D surveys, depending on the azimuths of the survey, but would appear in a survey using reflections at varying azimuths. True 3-D seismic prospecting, utilizing acoustic reflections at varying azimuths as well as at varying offsets to provide surface-versus-time data from which a volumetric image can be generated, is quite beneficial in locating such formations.

In order to provide an accurate 3-D volumetric image from reflection results at many azimuths and offsets, the spatial sampling interval must be sufficiently fine to avoid spatial aliasing (i.e., the inability to resolve spatial structures, analogous to time-domain aliasing in the field of signal processing). In addition, in order to adequately suppress noise and focus the image, each bin must not only have statistically sufficient fold, but also should have traces at varying offset distances and azimuths, and therefore coupling, to allow the use of conventional processes such as 3-D velocity determination, spatial filtering, correction for statics, dip moveout (DMO) corrections and migration.

Of course, the acquisition of such data can be quite cumbersome and expensive. An example of a prior 3-D survey technique, particularly directed to land surveying, is described in U.S. Pat. No. 4,933,912. In this technique, an areal array of sources and receivers is used to obtain a large amount of seismic data at varying azimuths and offset distances. As is apparent from this reference (especially considering its disclosed technique for selecting only some of the source-receiver combinations for analysis), 3-D surveys taken in such a manner can be quite cumbersome, slow, and expensive.

Other prior techniques are directed to facilitating the acquisition of sufficient seismic data to generate a 3-D survey. A common one of such prior techniques is the so-called "swath" survey, where the receiver array consists of a number of relatively closely spaced parallel lines of receivers, for example spaced by a distance on the order of one-eighth of a mile apart, each line of receivers being several miles long. In the marine context, the swath of receivers may be deployed as parallel lines of bottom-fixed receivers. According to this method, the seismic source location moves in a direction parallel to the lines of the swath, to provide parallel subsurface lines of midpoints.

While the swath survey is commonly referred to as "3-D" due to the areal distribution of the receivers, true three-dimensional surveys do not result from this method. This is because the geometry of the swath necessarily provides a non-uniform azimuthal distribution of data because most of the source-receiver paths are at nearly the same azimuth; to the extent that there is azimuthal variation in the swath survey, the azimuth is highly dependent on the offset distance. In addition, significantly more data are obtained for each bin from within a narrow azimuthal range (e.g., on the order of 5° or less) than at other angles, with the small amount of data from crossline azimuths limited to relatively short source/receiver offset distances. A directional bias is therefore necessarily present in this type of survey. Furthermore, there is generally insufficient interrelationship between passes or swaths to allow for proper correction of statics.

As a result of each of these limitations of the swath survey, the data processing techniques used therewith are conventionally limited to strictly 2-D analysis, treating the data from varying azimuths as though it is at a common azimuth with the majority of the data. This analysis limits the resulting survey to providing multiple 2-D surveys in parallel vertical planes. Furthermore, many traces in such a swath survey are redundant, i.e., having essentially common azimuth and offset with another trace. As a result, the swath survey is also quite inefficient.

Other examples of full 3-D land and marine surveys are described in U.S. Pat. No. 4,970,696, issued Nov. 13, 1990, assigned to Atlantic Richfield Company, and incorporated herein by this reference. In the land survey case described therein, seismic data of varying azimuths are acquired by arranging the receivers in multiple patterns, and moving the source location around the patch of multiple patterns. A similar survey is described in Crews, et al., "Applications of New Recording Systems to 3-D Survey Designs," Expanded Abstracts with Biographies 1989 Technical Program, 59th Annual International SEG Meeting, Paper SA 1.6, (Society of Exploration Geophysicists, 1989), pp. 624–27, also incorporated herein by this reference. As described at column 3, line 66 through column 4, line 3 of said U.S. Pat. No. 4,970,696, this technique is applicable to marine surveys with the receiver patterns placed on the seafloor or suspended thereabove. According to another embodiment described therein, a marine seismic survey is obtained by the towing of an array of receivers (corresponding to a pattern in the land case) through the off-shore region of interest, where a separate source vessel travels around the towed array to provide source seismic energy at the appropriate locations.

In each of the full 3-D surveys described in said U.S. Pat. No. 4,970,696, seismic data are acquired at many azimuths (i.e., relative angles between source and receiver locations). These data allow a true three-dimensional survey to be obtained, detecting sub-surface geological discontinuities which are at varying angles. In addition, other effects, such as near-surface effects, velocity changes, and the like may be characterized in the three-dimensional sense using these data. It should also be noted that the amount of data obtained (i.e., the fold) by such a true 3-D survey may be reduced, typically by a factor of from three to five, from that acquired according to prior 2-D surveys while maintaining the same degree of random noise attenuation. The theory explaining such fold reduction is described in Krey, "Attenuation of Random Noise by 2-D and 3-D CDP Stacking and Kirchhoff Migration", *Geophysical Prospecting* 35 (1987), pp. 135–147, also incorporated herein by this reference.

The methods described in U.S. Pat. No. 4,970,696 provide accurate and thorough surveys which are fully three-dimensional, by acquiring data at varying azimuths. It has been observed, however, that such surveys also provide significant redundancy in the data acquired, and accordingly are inefficient in some ways.

By way of further background, U.S. Pat. No. 3,753,222, issued Aug. 14, 1973, describes a three-dimensional land exploration technique including a plurality of parallel lines of geophones. As noted at column 2, line 65 through column 3, line 21 of this reference, seismic wave generating stations are deployed in lines offset from the longitudinal axis of the geophone groups, generally perpendicular to the geophone lines, and preferably aligned with a line of the geophones, with the spacing between stations in a line preferably equal to the spacing between lines of geophones. As disclosed therein, this arrangement provides a three-dimensional survey and is advantageous for static correction. The azimuthal bias of this land survey design should be noted, however.

By way of still further background, U.S. Pat. No. 4,677,598, issued Jun. 30, 1987, discloses a seismic data acquisition method in which corrections for statics is made. The survey includes multiple pairs of parallel receiver lines; source locations are arranged in line segments perpendicular to the receiver lines.

It is an object of the present invention to provide a marine seismic 3-D survey which provides reflection data having statistically significant azimuth and offset distributions for each bin.

It is a further object of this invention to provide such a survey which is particularly efficient in the deployment of marine receivers.

It is a further object of this invention to provide such a survey which allows for time-multiplexing of source and receiver combinations.

It is a further object of this invention to provide such a survey which efficiently provides fine spatial sampling so that aliasing is avoided.

It is a further object of this invention to provide such a survey which allows for flexibility in the fold of the survey without limiting the distribution of azimuth and offset for each bin.

Other objects and advantages of the present invention will be apparent to those of ordinary skill in the art having reference to the following specification together with its drawings.

SUMMARY OF THE INVENTION

The invention may be incorporated into a method of performing a marine seismic survey. Several lines of receivers, preferably bottom-fixed or otherwise maintaining a fixed position, are deployed in the survey area. A source vessel travels along a path which is substantially perpendicular to the lines of receivers, periodically firing a conventional seismic source. As a result, each bin (i.e., midpoint) will receive reflection data from a statistically significant azimuth and offset distribution, providing efficient collection of true 3-D data. The fold of data may be reduced, thus gaining additional efficiency, by firing the source only over certain portions of the path. Further in the alternative, time-multiplexing of different receivers with different shots or paths can provide additional areal coverage with the same number of recording channels.

DETAILED DESCRIPTION OF THE PREFERRED EMBODIMENTS

Figure 1:
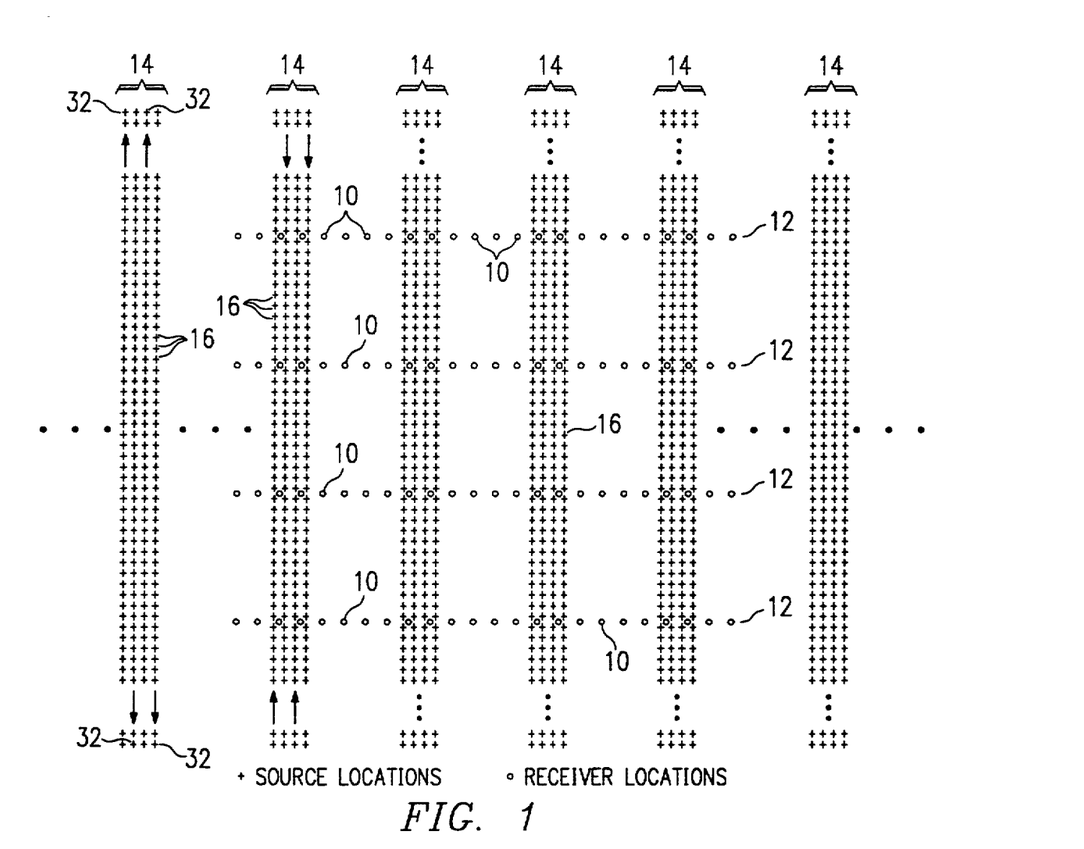
FIG. 1 is a plan illustration of a portion of a survey performed according to a first embodiment of the invention.

Referring now to FIG. 1, a plan view of a portion of a marine survey according to a first embodiment of the invention will now be described in detail. In the survey of FIG. 1, multiple lines 12 of seismic receiver stations 10 are deployed in the marine survey area. Each receiver station 10 is of the conventional type for receiving the reflected seismic energy of interest, and as such may consist of a single receiver, but preferably includes multiple receivers. Multiple receivers associated with a receiver station 10 may be located near the same point, or spread out about a central location over a given distance; in either case, it is preferred that each receiver station 10 is fixed in position relative to the seafloor, according to this embodiment of the invention.

The types of receivers included within receiver stations 10 will be determined according to the type of seismic energy to be detected. Examples of conventional receivers useful in this embodiment of the invention include conventional gimballed geophones deployed in contact with the seafloor; as is well known, geophones detect energy in the form of velocity, and receive directional information. Conventional geophones may be configured to detect compressional, horizontal shear or vertical shear energy.

Alternatively, receiver stations 10 may be conventional hydrophones which are deployed on or above the seafloor but fixed in position. As is well known, hydrophones detect seismic energy transmitted as pressure, without a directional indication. Copending application Ser. No. 697,637, and application Ser. No. 697,573, both filed May 8, 1991, both assigned to Atlantic Richfield Company, and both incorporated herein by this reference, describe arrangements of hydrophones which are particularly useful in receiver stations 10 according to this embodiment of the invention. As will be apparent hereinbelow, when hydrophones are used in receiver stations 10, deployment at substantial depths from the surface is preferable to allow a towed source, as is used in this embodiment of the invention, to travel thereover. In addition, deep deployment reduces inaccuracies in position due to currents and other surface effects. Combination of both hydrophones and geophones for each receiver station 10 is particularly preferred, as the directional information detected by the geophones can be used in de-ghosting the pressure information detected by the hydrophones.

As illustrated in FIG. 1, receiver stations 10 are deployed in multiple lines 12 which are substantially parallel to one another, and over an area of the seafloor centered within the survey area. In this example, each line 12 includes a plurality of receiver stations 10, together with suitable conventional telemetry equipment for communication of electrical signals corresponding to the received seismic energy. Each line 12 includes a number of receiver stations 10, for example twenty-four receiver stations in the survey of FIG. 1, with the distance between individual ones of receiver stations 10 in the same line 12 preferably on the order of 16 to 100 meters. A preferred example of the distance between lines 12 is on the order of 200 to 400 meters. As will be apparent from the description hereinbelow, the survey will acquire data for midpoints over an area greater than that over which receiver stations 10 are deployed.

According to this embodiment of the invention, the preferred seismic source is a conventional marine seismic source towed behind a conventional seismic vessel. Because the towed source will be fired periodically, the preferred source of seismic vibrations is a compressed air gun or other source capable of periodic firing.

According to the embodiment of the invention shown in FIG. 1, the source vessel will travel along relatively closely spaced tracks 32, with locations 16 illustrating the locations at which the source is fired while the vessel is traveling therealong. Also according to this embodiment of the invention, tracks 32 are grouped into paths 14 (e.g., four tracks 32 per path 14), with tracks 32 closely spaced within a path 14, for example 25 to 50 meters apart. As is apparent in FIG. 1, paths 14 preferably do not overlap one another, and are separated by a significant distance. For example, paths 14 in the survey of FIG. 1 are approximately 400 meters apart, center line to center line, so that the gap between adjacent paths 14 is on the order of 250 to 325 meters. Each track 32, and thus each path 14, is preferably substantially perpendicular to lines 12 of receiver stations 10. Some paths 14 near the center of the survey area will cross over receiver stations 10 in lines 12; other paths 14 are outside of receiver stations 10 and thus do not cross over any receiver stations 10.

In addition, the length of each path 14 extends well beyond the area defined by lines 12 of receiver stations 10; in the example of FIG. 1, the length of each path 14 is on the order of twice the distance between the outside lines 12 of receiver stations 10. The extension of the area defined by paths 14 beyond the area defined by lines 12 provides data at varying offset and azimuth for each bin, which is without significant azimuthal bias. As will also be discussed in further detail hereinbelow, the arrangement of lines 12 of receiver stations 10 allows for such relatively sparse paths 14, providing significant efficiency in the performing of the survey.

In operation, the survey according to the arrangement of FIG. 1 is obtained from seismic energy imparted by a source vessel traveling along each path 14. Shots are fired periodically, for example every 10 to 20 seconds, or every 25 to 50 meters, as illustrated by source locations 16 in each path 14. Receiver stations 10 in the multiple parallel lines 12 receive reflected vibrational energy from the firing of the source at source locations 16, after the energy has reflected from sub-surface geology in the region. It should be noted that refracted energy may also be detected and analyzed according to the present invention. At the end of each track 32 within each path 14, the source vessel turns around 180°, and travels in the opposite direction along the next track 32 in the same path 14, or in a track 32 in the next path 14, as the case may be, similarly firing the seismic source at source locations 16 therealong. It may be preferred, from the standpoint of ease of navigation, for the source vessel to travel a track 32 in another path 14 after completion of each track 32, to minimize sharp turn-around of the vessel. Signals corresponding to vibrations detected by receiver stations 10 are communicated to a recording unit or computer, for conventional storage and output, and also conventional analysis such as move-out, common midpoint (CMP) gathers of traces, statics correction, migration and the like. The data acquired by this survey will provide a true 3-D survey of the sub-surface volume underlying the survey area, as will be noted hereinbelow.

Figure 2A:
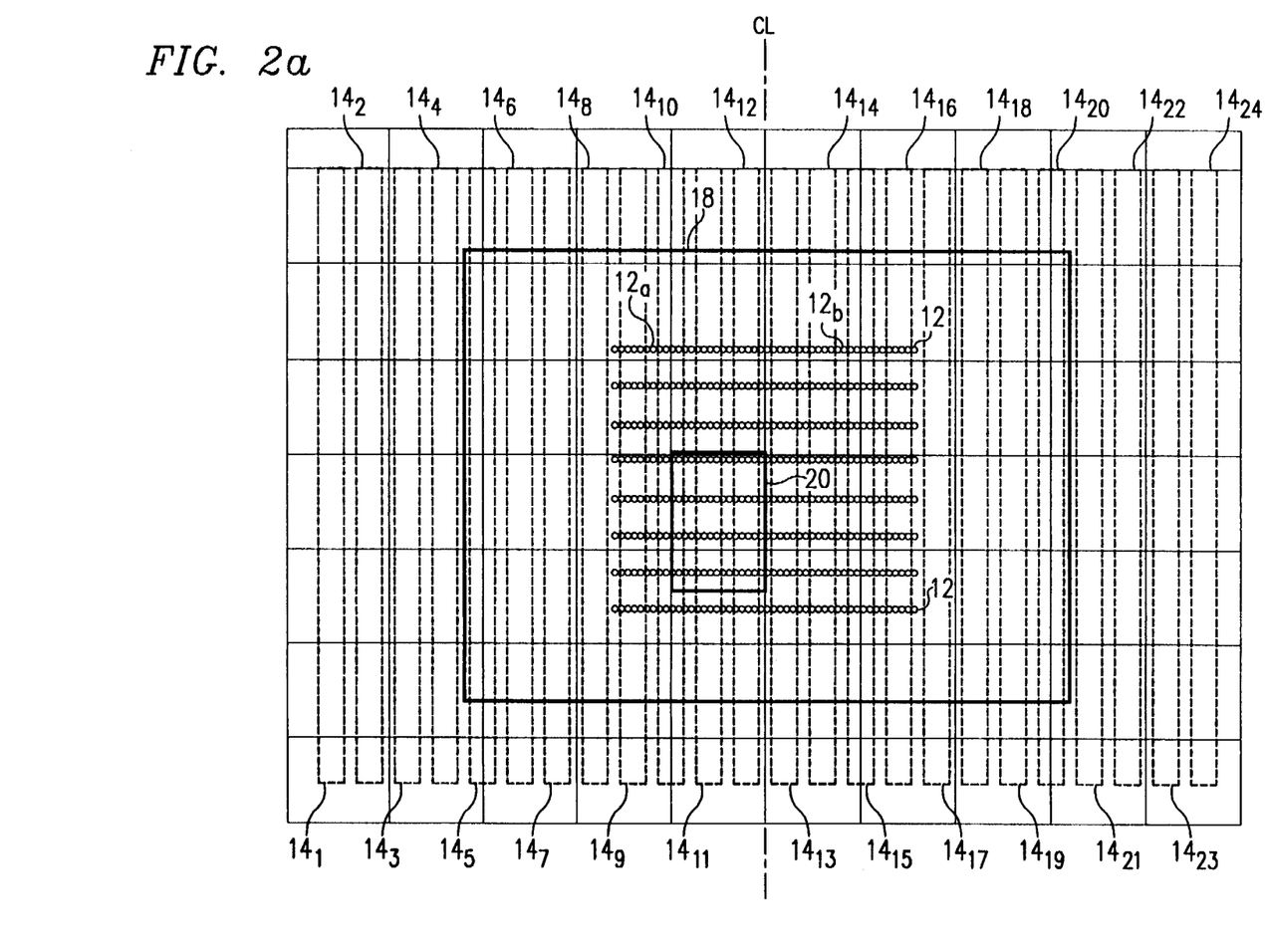
FIGS. 2a and 2b are plan illustrations of an example of a survey according to the first embodiment of the invention.

FIG. 2a illustrates an exemplary survey according to the present invention, corresponding to an actual field test performed in a marine environment. The survey also includes a technique and particularly useful in efficiently surveying a wide area. In the survey of FIG. 2a, each line 12 of receiver stations 10 includes forty-eight evenly spaced receiver stations 10, grouped into two groups 12a, 12b of twenty-four contiguous receiver stations 10 each; FIG. 2a illustrates the division of the two groups 12a, 12b in each line 12 of receiver stations 10 by center line CL. This segmenting of each line 12 is useful where the number of data recording channels is limited, as it was in the field test of this survey. Each group 12a, 12b in line 12 is approximately 1600 meters in length, with receiver stations 10 within each line 12 spaced approximately 67.0 meters apart in this example. Lines 12 are separated from one another by a distance on the order of 400 meters.

In the survey of FIG. 1 and as shown in FIG. 2a, it is contemplated that most surveys will be performed with a number of paths 14 outside of the area of receiver stations 10. In the survey of FIG. 2a, each path 14 is centered approximately 400 meters from one another, with eight paths 14 beyond the ends of lines 12 on either side. As in the example of FIG. 1, each path 14 includes four tracks 32 therewithin, spaced apart by approximately 33.5 meters, with each source location 16 within a track 32 spaced apart by approximately 33.5 meters. Each gap between paths 14 in this example is approximately 300 meters wide.

Also in this survey, not all paths 14 will "shoot into" all receiver stations 10. For example, energy from source locations within paths $14_1$ through $14_{20}$ will be sensed by receiver stations in groups 12a, and energy from source locations within paths $14_5$ through $14_{24}$ will be sensed by receiver stations in groups 12b. Accordingly, the twenty paths 14 associated with one of groups 12a, 12b will be on the order of 8000 meters wide, while the full width of paths 14 in FIG. 2a is on the order of 9600 meters. Each group 12a, 12b is thus approximately centered within its twenty paths 14 associated therewith. The length of each path 14 is on the order of 6400 meters, with lines 12 centered over the center 3200 meters of the path lengths.

While two groups 12a, 12b are provided in the survey of FIG. 2a, additional groups of receiver stations 10 may of course be added to extend lines 12 which, together with additional paths 14, would increase the width of the survey. As will also be described hereinbelow, additional lines 12 may be provided to increase the size of the survey in the other dimension.

Area 18 in FIG. 2a illustrates the range of midpoints available in this exemplary survey, and accordingly the range of the volume image generated by the survey. The outer edge of the area 18 can be readily determined by locating the midpoint between the outer source locations 16 and the outer receiver stations 10. Each combination of a source location 16 and a receiver station 10 is associated with a midpoint location within area 18, with multiple source-receiver station combinations having substantially the same midpoint, particularly for midpoints located among receiver stations 10. Of course, for midpoints outside of the area of receiver stations 10, the fold and near offset distribution will be reduced. Upon completion of the survey, each time-domain trace of detected vibrations associated with a midpoint (or within a portion of area 18 within a given resolution) may be gathered into a bin, in conventional common midpoint (CMP) fashion. According to this example, given the above described distances, the spatial sampling in this survey is quite fine, with a midpoint located at approximately every 16.75 meters within area 18.

Figure 2B:
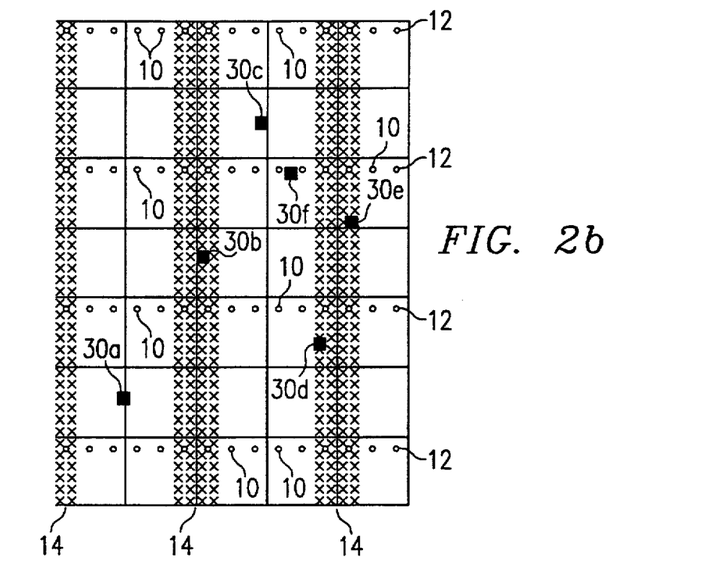

FIG. 2b is an enlarged plan view of portion 20 of the survey of FIG. 2a, illustrating six sampled bins within area 18, particularly located among receiver stations 10. FIGS. 8a through 8f show the modeled distribution of offset versus azimuth for each of the six sampled bins 30a through 30f, respectively shown in FIG. 2b. In FIGS. 8a through 8f, the length of each ray in a bin corresponds to a relative offset distance, and the direction of the ray in a bin corresponds to the azimuth of the trace. As is evident from FIGS. 8a through 8f, the survey of FIG. 2a provides 128 traces for each of the sampled bins; accordingly, the survey of FIG. 2a is a 128-fold survey. In addition, each of the sampled bins includes traces at varying offset distances (i.e., source-receiver distances) and varying azimuths (i.e., direction between source and receiver). FIGS. 9a through 9f show offset distance histograms for each of the sampled bins 30a through 30f respectively, over a range of 24 to 6536 meter offsets, with each increment separated by 651 meters; the wide variation of offsets is thus evident.

The 128-fold resulting from the exemplary survey of FIG. 2a is much larger than generally necessary for production seismic surveying, but was gathered for purposes of experimentation and verification. Indeed, as shown in FIG. 2c, this field test of the survey provided sixty-four unique offset-azimuth combinations per bin, but with two traces having substantially the same offset distance and azimuth; therefore, reduction of the fold by a factor of two for this survey would not reduce the coverage. Because 3-D surveys of at least 32-fold will generally provide sufficient noise reduction to provide acceptable accuracy, especially considering the relatively fine spatial sampling of the present invention, the fold may be further reduced from that in the above-described field test while still providing sufficient data for an accurate survey. Methods for taking advantage of the reduction in fold to increase the area of coverage will be discussed hereinbelow.

In the survey of FIG. 2a, as noted hereinabove, each bin within the area of receiver stations 10 will be of at least 128-fold, with statistically significant distributions of offset distances and azimuths. It is contemplated that the plots of FIG. 2c are typical for each bin among receiver stations 10. It should be noted, of course, that there will be some degree of variation of the actual offset-azimuth plots from bin-to-bin, as is evident in FIG. 2c. Each bin, however, includes traces at varying azimuths and varying offsets, which provides sufficient 3-D data so that an accurate volume image can be obtained of the subsurface geology underlying the seafloor in area 18. It should also be noted that significant data will be obtained for bins which are outside of the area of receiver stations 10, and which will be useful in generating the full 3-D volume image of the survey region. The data for these bins will necessarily have some amount of directional bias, however, due to their position relative to receiver stations 10.

While it is illustrated that paths 14 are perpendicular to lines 12, each of lines 12 being parallel to one another, other angles of paths 14 to lines 12 may be utilized in the present invention. True perpendicularity is preferred, however, in order to provide the greatest variation of offset distances and azimuths for all bins. The conventional swath survey discussed hereinabove illustrates the extreme case where the source vessel travels parallel to the receiver lines, resulting in directional bias of a large degree.

As is well known, the survey acquired as described hereinabove utilizes a fixed number of parallel data recording channels, along which the vibrations detected by each receiver station 10 is communicated. Accordingly, for each of the eight groups 12a, 12b of twenty-four receiver stations 10 in the survey of FIG. 2a, communications capability of 192 parallel recording channels (or the equivalent multiplexed communications) is required to obtain information from each shot associated therewith. Doubling of the area to be covered by the survey could, of course, be achieved by doubling the number of lines 12 upon which receiver stations 10 are mounted, but this would require doubling the communications capacity. Alternatively, doubling the distance between receiver stations 10 would also double the area covered, but the spatial sampling would be reduced accordingly, increasing the likelihood of spatial aliasing.

Figure 3A:
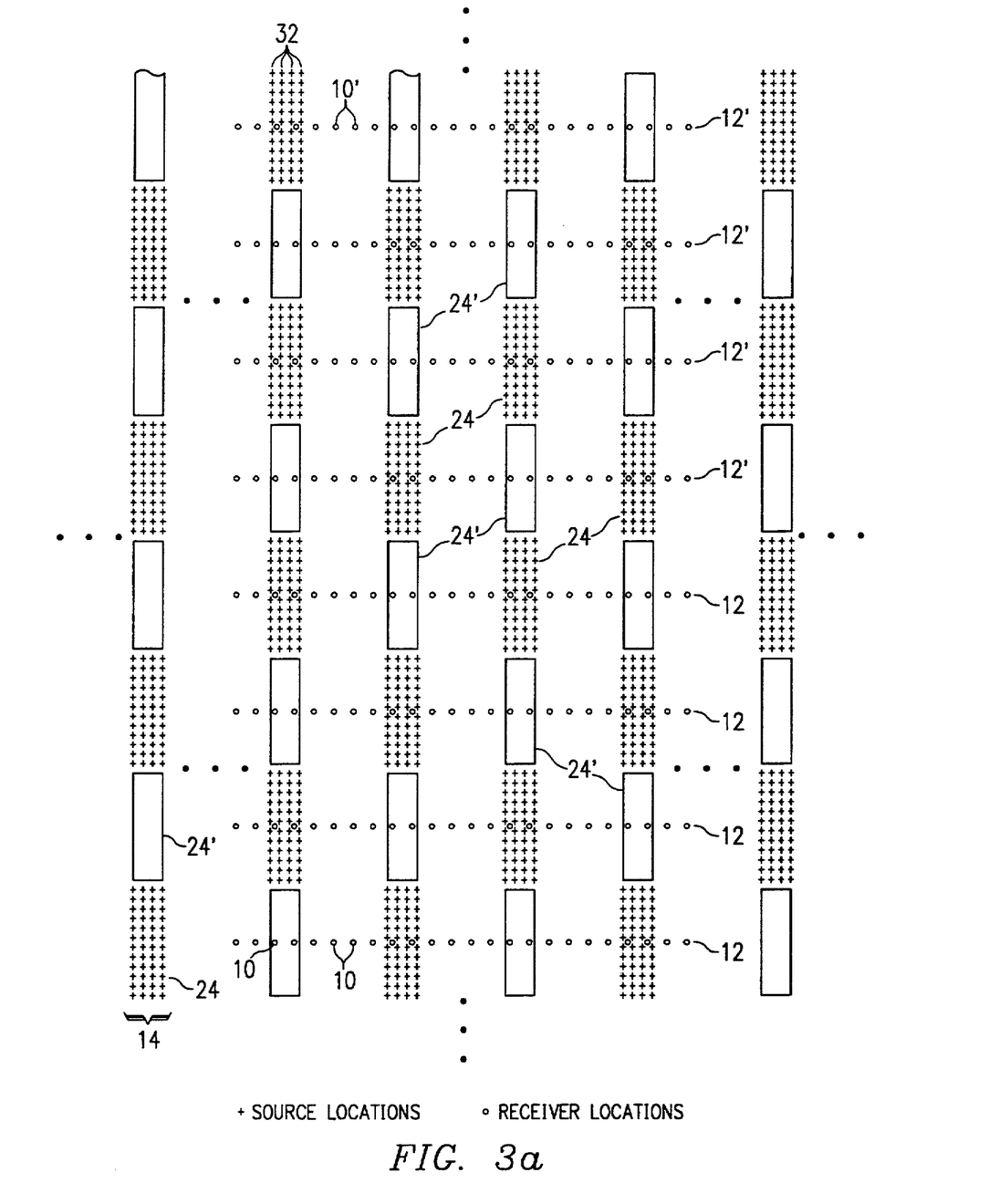
FIGS. 3a, 3b and 3c are plan illustrations of a portion of a survey performed according to a second embodiment of the invention.
Figure 3B:
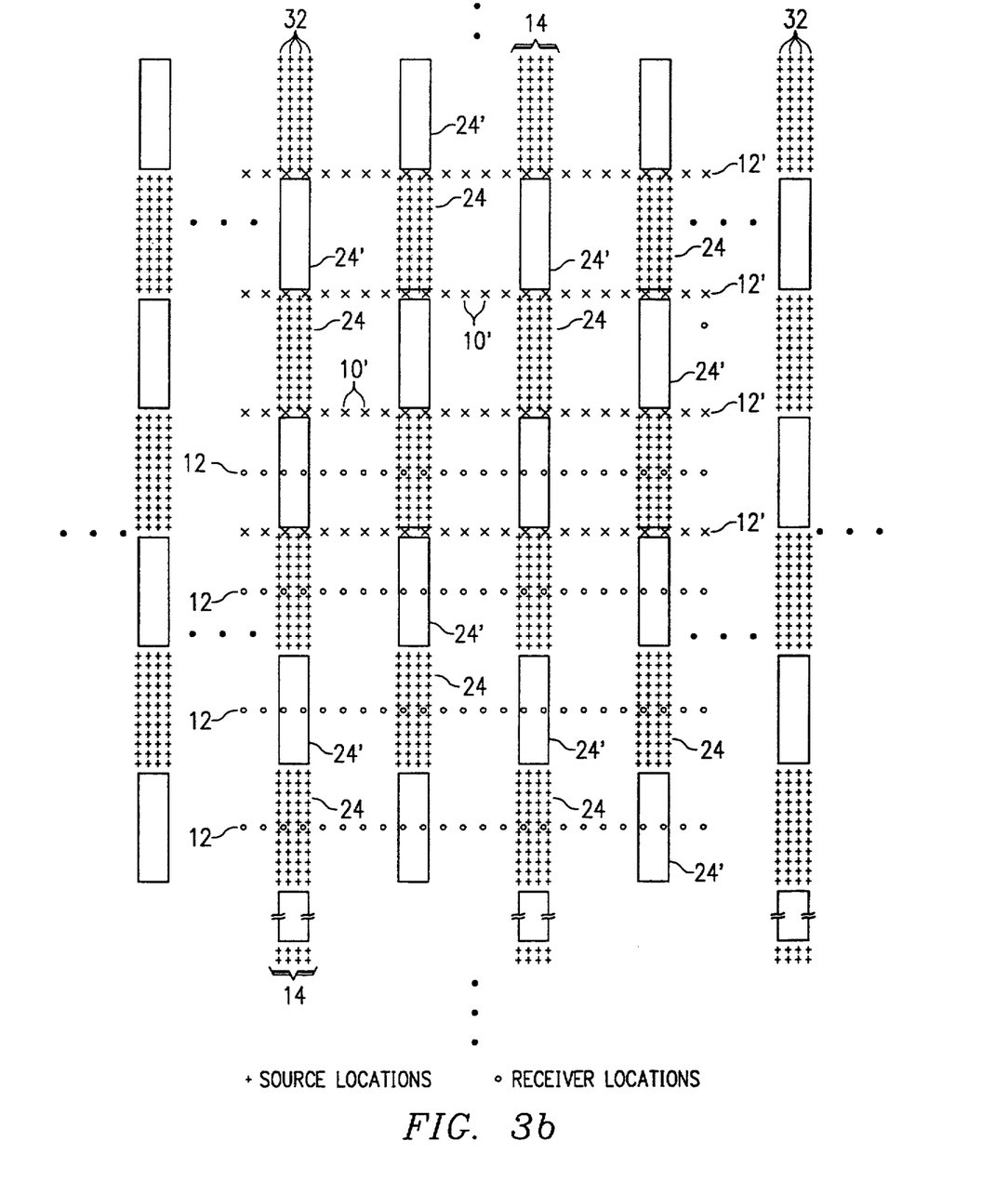
Figure 3C:
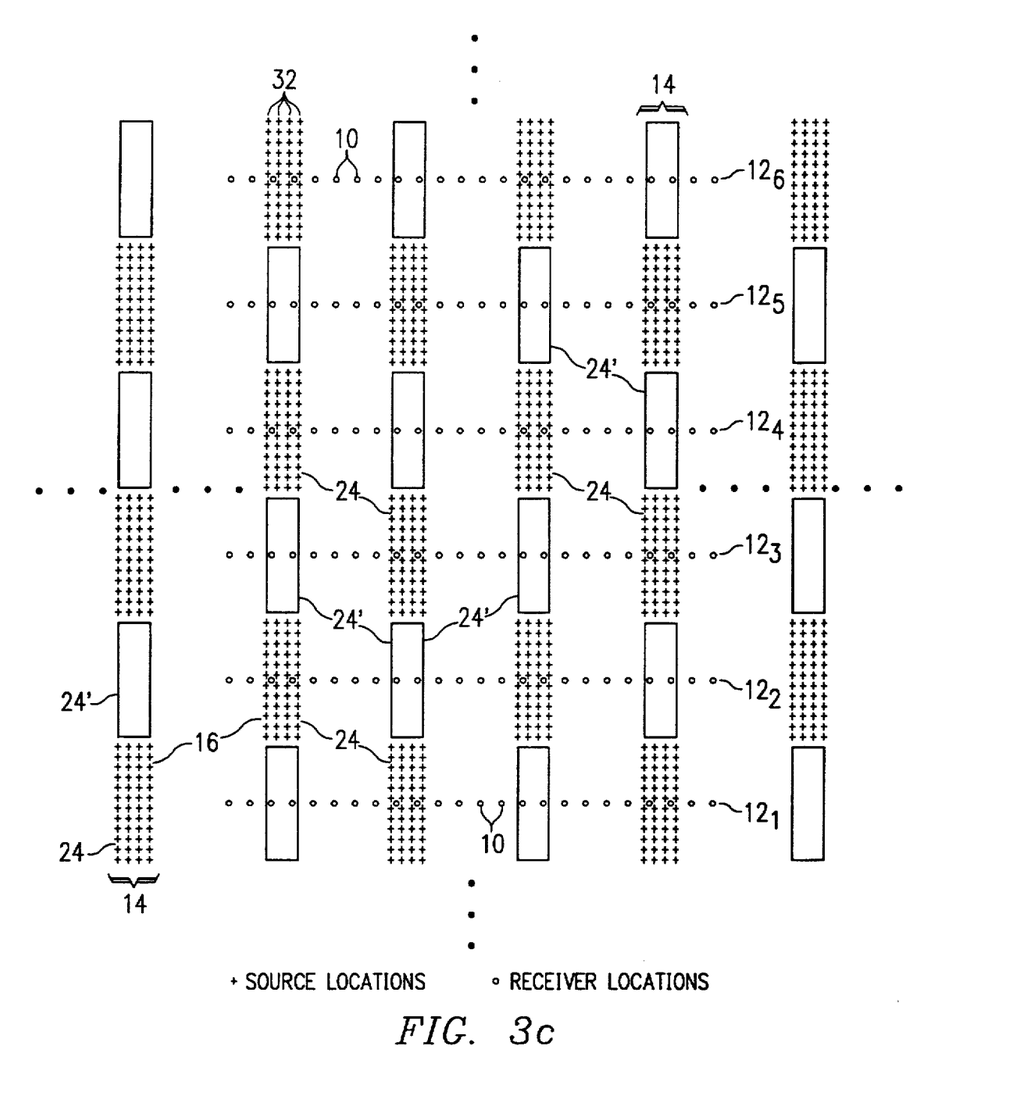

Referring now to FIGS. 3a, 3b and 3c, alternative surveys according to the present invention will now be described. FIG. 3a illustrates a survey in which a set of lines 12 of receiver stations 10 and a set of lines 12' of receiver stations 10' are deployed in the survey region to double the surface area covered. As shown in FIG. 3a, the set of lines 12' are deployed parallel with and adjacent to the set of lines 12. It is contemplated that other placement of lines 12' relative to lines 12 may alternatively be used, for example, lines 12' may be placed collinear with and adjacent to lines 12, in similar manner as the segmented lines 12 described hereinabove relative to the survey of FIG. 2a. Further in the alternative, lines 12' may be spaced apart from lines 12, either in the parallel or collinear direction, depending upon the particular survey design.

According to this embodiment of the invention, received data is recorded from receiver stations 10 and 10' in an alternating, time-multiplexed fashion. Such multiplexing provides for larger areal coverage, due to the larger area covered by lines 12, 12' considered together, without reduction in the spatial sampling and without requiring additional parallel data recording channels; the multiplexing reduces the fold of the survey but, as noted hereinabove, accurate 3-D surveys can be made with reduced fold from that of the surveys of FIGS. 1 and 2a.

The time-multiplexing of recording is accomplished in a synchronous manner with the firing of the towed source as it follows tracks 32 in paths 14. According to this embodiment of the invention, receiver stations 10, 10' are alternately enabled to detect and record seismic energy from shots fired in different portions of the tracks 32 in paths 14. For example, for each source location 16 within patches 24 of paths 14, receiver stations 10 in lines 12 are enabled; conversely, for each source location 16 within patches 24' of paths 14, receiver stations 10' in lines 12' are enabled. In this example, each patch 24, 24' is a sequence of 12 source locations 16 for each of the four tracks 32 therein.

As a result, the survey obtained from this alternative embodiment, using the same number of source locations 16 and recording channels as in the surveys described above, covers twice the survey area, at half the fold; as noted hereinabove, sufficient fold will still remain to provide adequate noise reduction. In addition, the doubling of the survey area is obtained while maintaining the spatial sampling as fine as in the above-described survey of FIG. 1.

Referring now to FIG. 3b, another alternative embodiment of a survey according to the present invention, and which is similar to the embodiment of FIG. 3a, will now be described. In the survey of FIG. 3b, a first group of substantially parallel lines 12 of receiver stations 10 is provided, as in the prior examples. The survey area is increased, however, by the provision of receiver stations 10' in a second group of substantially parallel lines 12', over an area of the seafloor near the first group of lines 12. As shown in FIG. 3b, spatial overlap of the receiver stations 10' with the area covered by receiver stations 10 in the direction of shooting is preferred to preserve subsurface mixing. While four lines 12, 12' are illustrated in FIG. 3b as within each set, it should be noted that the number of lines, and the extent of their overlap, can differ according to the survey needs.

The embodiment of the invention in FIG. 3b also provides for a larger survey area without reducing the spatial sampling and without requiring additional parallel data recording channels. In performing the survey according to this technique, the same number of recording channels may be used as in the survey of FIG. 1, since the detected vibrations from the two sets of receiver stations 10 and 10' are time-multiplexed. The time-multiplexing is accomplished in a synchronous manner with the source as it follows paths 14 in FIG. 3b, with sequences of shots alternated between the two sets of receiver stations 10, 10'. For example, responsive to a sequence of twelve shots fired from source locations 16 in portions 24, receiver stations 10 are enabled to detect and communicate the reflected energy. Conversely, for each sequence of twelve shots from portions 24' of paths 14, receiver stations 10' in lines 12' are enabled to receive and communicate reflected seismic energy. As a result of this alternative embodiment, no more than one set of recording channels is necessary, while maintaining the spatial sampling as fine as in the embodiment of FIG. 1.

In FIG. 3c, six lines $12_1$ through $12_6$ of receiver stations 10 are deployed in the survey region, covering a 50% larger coverage area than a four line survey as illustrated in FIG. 1, i.e., the two sets of receiver stations 10 have a 50% "roll-up". According to this embodiment of the invention, however, selection of which receiver stations 10 are to be enabled for seismic shots from particular source locations 16 also provides larger areal coverage without reducing the spatial sampling and without requiring additional parallel data recording channels. This is accomplished by the time-multiplexing of various ones of the lines 12 of receiver stations 10 in the arrangement of FIG. 3c.

The time-multiplexing is accomplished in a synchronous manner with the source as it follows paths 14 in FIG. 3c. For certain portions of each path 14, different lines 12 will be enabled to detect or record seismic energy. For example, for each source location 16 within patches 24 of paths 14, receiver stations 10 in lines $12_1$ through $12_4$ will be enabled; conversely, for each source location 16 within patches 24' of paths 14, receiver stations 10 in lines $12_3$ through $12_6$ will be enabled. Each patch 24, 24' in FIG. 3c consists of a sequence of twelve source locations 16, in this example. As a result of this alternative embodiment, for the same number of source locations and same number of recording channels as in the survey of FIG. 1, the survey region is 50% larger. In addition, the spatial sampling is as fine in the survey of FIG. 3c as in the embodiment of FIG. 1.

Variations in the numbers of shots fired in each portion 24, 24' of the paths of FIGS. 3a, 3b and 3c can be made, depending upon the distribution of the data desired. For example relative to FIG. 3b, for portions 24' which are distant from lines 12', the number of shots fired in each pass may be reduced; conversely, the number of shots fired may be increased for each portion 24, 24' as it approaches or is within the area covered by its associated receiver lines 12, 12', respectively.

By way of the alternating reallocation of sets of receiver stations for given groups of shots, as in each of the embodiments of FIGS. 3a, 3b and 3c, increased area may be imaged and fold may be reduced, with improvements in acquisition efficiency gained. As noted in the Krey article cited hereinabove, however, the fold of a 3-D survey may be reduced from that of a 2-D survey while maintaining the same degree of random noise attenuation from the CMP stacking operation as that for the 2-D data. Also as noted above, the survey of FIG. 2a provides for 128-fold, which is excessive for many production quality surveys. Of course, reduction in the fold similarly reduces the data processing requirements in performing the analysis. Accordingly, the present invention provides flexibility in the acquisition of the necessary fold data for each bin, and the maximizing of the area covered by the survey.

Figure 4:
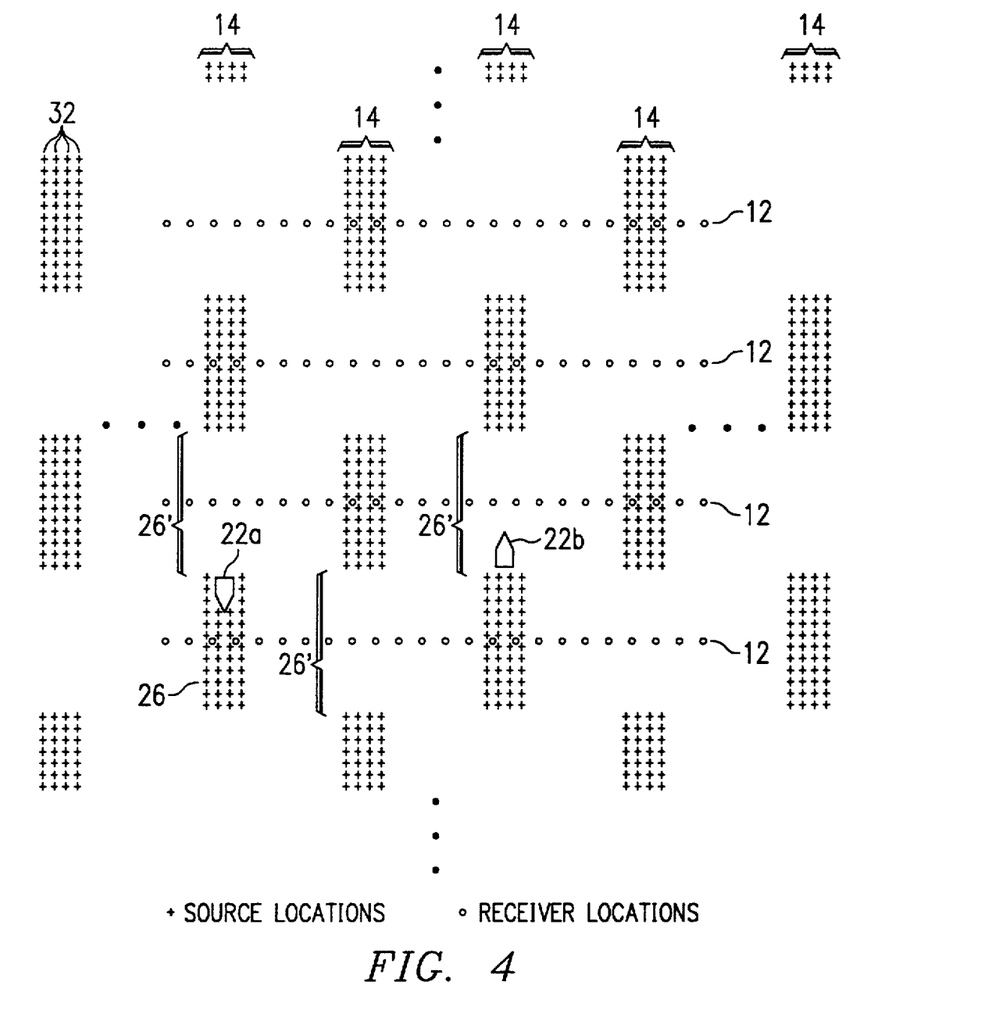
FIG. 4 is a plan illustration of a portion of a survey performed according to a third embodiment of the invention.

Referring to FIG. 4, an alternative embodiment of the invention will now be described which achieves further acquisition efficiency. In the arrangement, two source vessels 22a and 22b are illustrated, each of which are traveling along a different path 14 in the survey area. During the acquisition of the reflected vibration data, one vessel 22 is located within a portion 26 of a path which includes source locations 16 at which the towed source is fired, during such time the other vessel 22 is located within a portion 26' at which the source is not to be fired. In the example of FIG. 4, vessel 22a is in a portion 26 of a path 14 and is operable to fire the seismic source therein; simultaneously, vessel 22b is in a portion 26' of another path 14, and is not firing its source. As a result of this embodiment of the invention, the time required for the survey is reduced by on the order of a factor of two by using the two source vessels, while still allowing for receiver stations 10 to respond to energy from a unique source location.

Figure 5:
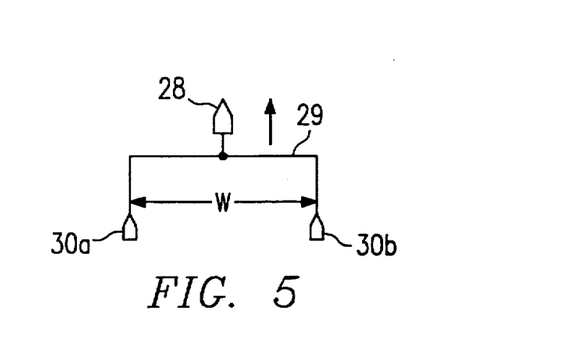
FIG. 5 is a plan illustration of a source vessel towing two sources as useful for a fourth embodiment of the invention.
Figure 6:
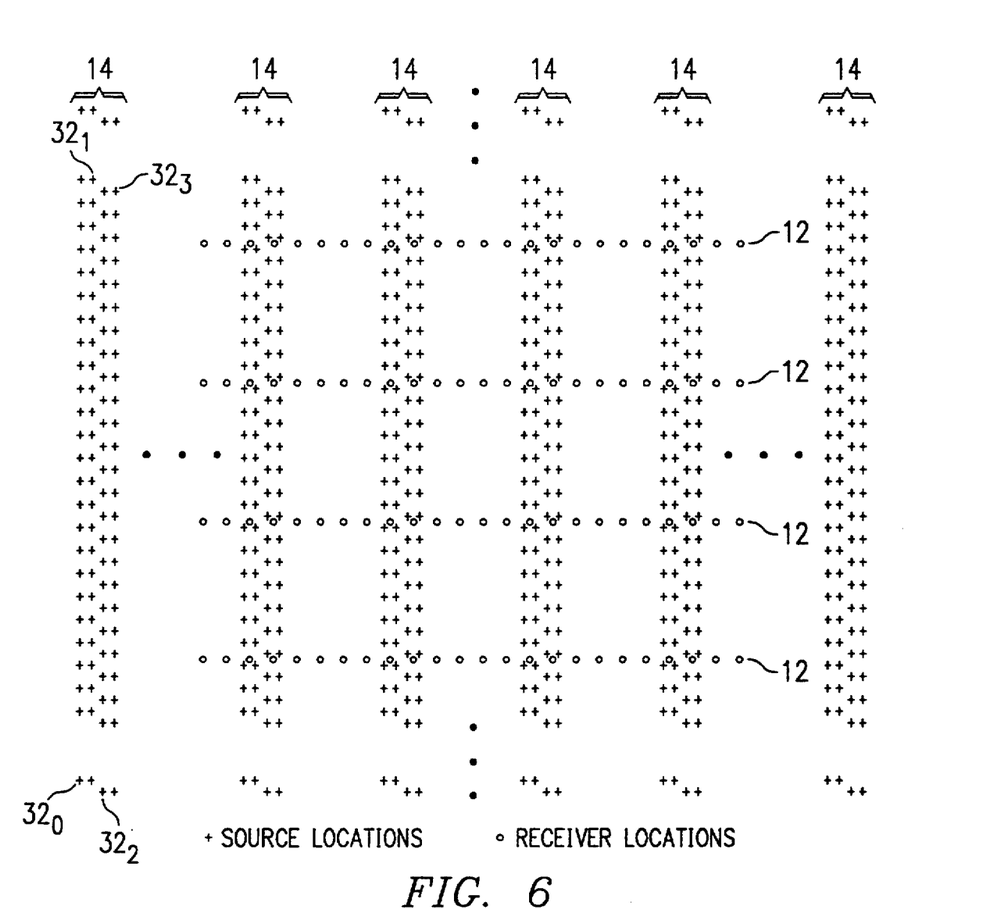
FIG. 6 is a plan illustration of a portion of a survey performed according to a fourth embodiment of the invention.

Referring now to FIGS. 5 and 6, another alternative embodiment of the invention is illustrated. FIG. 5 illustrates a vessel 28 towing two sources 30a and 30b which are maintained at a fixed position relative to one another, for example by way of a conventional towing bracket 29. Sources 30a and 30b are separated by one another in width by a distance w which is twice the distance between desired tracks 32 in each path 14. For example, where the tracks 32 within a path are to be on the order of 50 meters apart, the separation w is on the order of 100 meters.

Referring now to FIG. 6, a survey utilizing vessel 28 of FIG. 5 will now be described in detail. As vessel 28 travels along path 14, sources 30a and 30b follow two tracks 32 therein, and are alternately fired. For example, in path 14' of FIG. 6, tracks $32_0$ and $32_2$ are followed by sources 30a and 30b, respectively, during one pass. During the next pass, vessel 28 moves laterally so that sources 30a and 30b travel along tracks $32_3$ and $32_1$, respectively, in the opposite direction but still substantially perpendicular to lines 12. The firing of sources 30a and 30b alternates, and is staggered, so that the source locations 36 are shifted relative to one another in the manner illustrated in FIG. 6. As a result, the time required for acquiring the marine seismic data is reduced since only one-half as many passes of the towing vessel 28 through the survey are is required, while still firing a single shot from a unique location at any one time.

Alternatively to the survey of FIGS. 5 and 6, the width w between sources 30a and 30b may be reduced to one-half that shown in FIG. 5 (e.g., w=50 meters). In traveling a path 14 according to this alternative, adjacent tracks 32 will be traveled by the two sources 30a, 30b which are alternatively fired in staggered fashion. The shorter width in this alternative is preferable from the standpoint of navigation of the vessel; however, in order to maintain uniform coverage using this alternative, some adjustment to the geometry of receiver stations 10 may be necessary. For example, the location of receiver stations 10 in alternative lines 12 may need to be shifted by one-half the distance between receiver stations 10 in a line, or receiver stations 10 added to increase the density within a line 12. It is contemplated that this alternative, and other alternatives, will now be apparent to one of ordinary skill in the art having reference to this specification.

Figure 7:
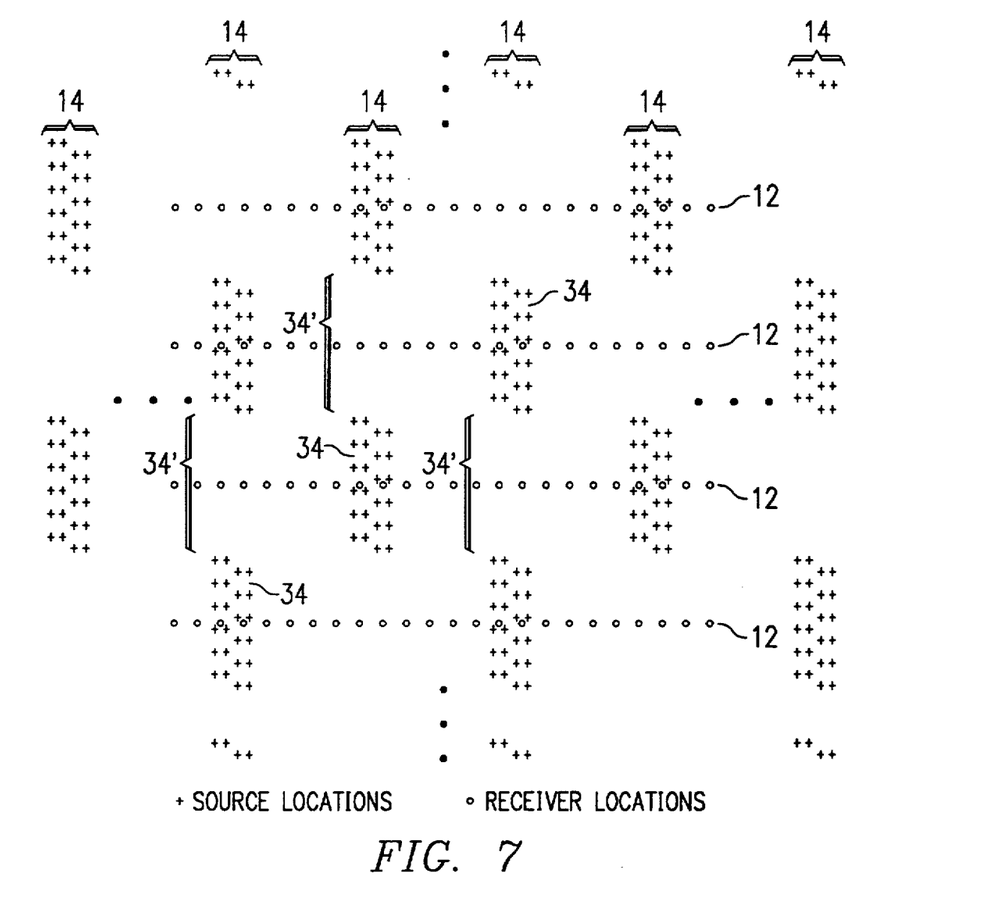
FIG. 7 is a plan illustration of a portion of a survey performed according to a fifth embodiment of the invention.
Figure 8A:
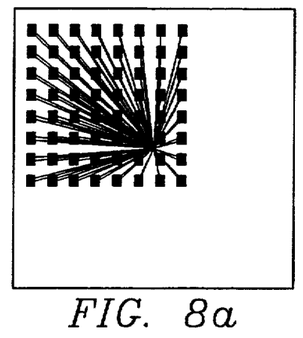
FIGS. 8a through 8f are plots of the distribution of azimuth for selected bins in the example of FIGS. 2a and 2b.
Figure 8B:
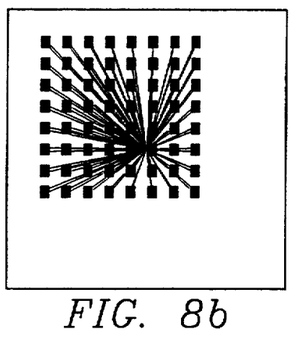
Figure 8C:
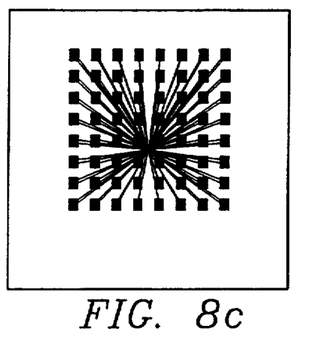
Figure 8D:
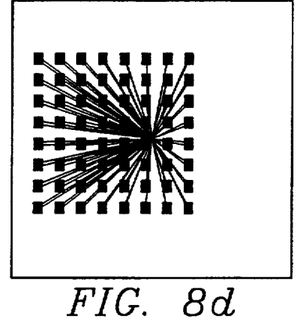
Figure 8E:
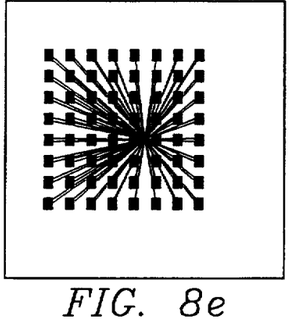
Figure 8F:
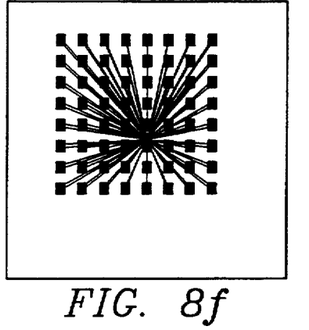
Figure 9A:
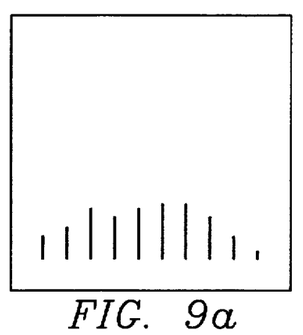
FIGS. 9a through 9f are plots of the distribution of offset for selected bins in the example of FIGS. 2a and 2b.
Figure 9B:
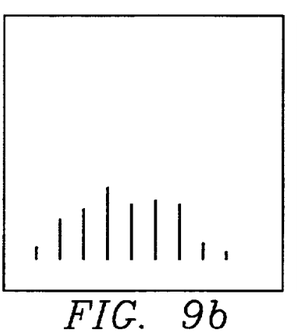
Figure 9C:
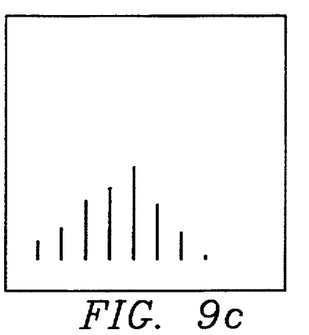
Figure 9D:
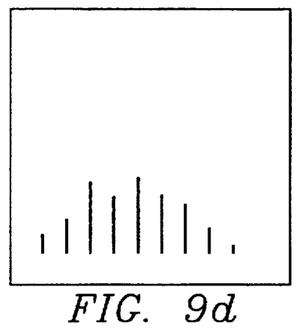
Figure 9E:
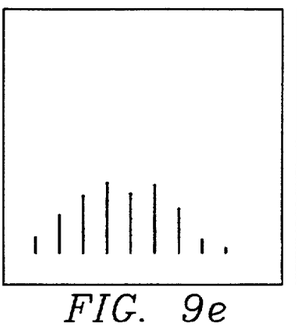
Figure 9F:
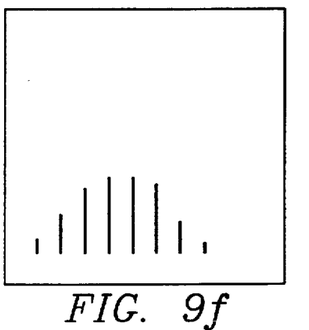

Referring now to FIG. 7, another alternative embodiment of the invention is illustrated which incorporates the multiple source towing of FIGS. 5 and 6 together with the time-multiplexing of FIG. 4. In FIG. 7, portions 34 of each path 14 include source locations 36 at which sources 30a and 30b (of FIG. 5) are alternately fired in a staggered manner. Each path 14 of FIG. 7 includes portions 34' during which a particular source vessel either fires no shots, or alternatively fires shots for receipt by an additional set of lines 12 of receiver stations 10. Further in the alternative, multiple source vessels 28 may be provided to further enhance survey efficiency by maintaining one vessel 28 in a firing portion 34 of each path 14, and the other vessel 28 in a non-firing portion 34'; each vessel 28 towing a pair of sources 30 as illustrated in FIG. 5.

Important advantages are provided by each of the above-described embodiments of the invention. As is evident from FIGS. 2a through 2d particularly, and as contemplated for the other alternative surveys, each bin includes seismic data at statistically significant distributions of offset distance and azimuth. As a result, directional bias of the seismic data is reduced, and the survey is efficient since redundant data are avoided. Furthermore, the spatial sampling provided by the present invention is quite fine, and the fold sufficiently high that residual 3-D static correction techniques may be applied to improve the accuracy of the resulting survey.

Each of these survey attributes are achieved in an efficient manner according to the present invention. Firstly, the source effort (i.e., number of locations at which shots are fired) is high relative to the receiver effort (i.e., number of receiver station locations). It is generally more difficult to deploy receivers in marine seismic surveys than sources, particularly considering the opportunity for damage of receiver equipment during handling and deployment, especially for bottom-fixed receivers. The substantially parallel nature of the paths traveled by the source vessel also provides for efficient surveying, by reducing the fraction of time that the source vessel is inactive along each path. Further efficiency is realized by the present invention, as the source locations can be relatively sparse (i.e., the gaps are larger than the path width) while still acquiring significant fold for each bin, reducing the number of shots required for each survey. As a result, the reduced numbers of receivers used according to this invention, together with the large amount of data acquired considering the number of receivers, makes the present invention particularly advantageous for use in a marine environment.

The present invention further allows for significant flexibility in the acquisition of statistically significant information. For example, the fold and offset distribution can be readily modified by modifying the paths traveled by the source vessel. Particularly, the paths need not be evenly spaced across the survey area; for example, the path spacing may be widened at distances away from the receiver stations. In addition, the lines of receiver stations need not be uniformly spaced, depending upon the survey results desired. An example of non-uniform spacing of receivers is that of the above-referenced U.S. Pat. No. 4,677,598, in which the receivers are arranged in closely-spaced pairs of parallel lines, where the spacing between lines in a pair (i.e., the "minimum grid") matches the spacing between source locations. It is contemplated that one of ordinary skill in the art, having reference to the present specification, will be able to alter or design the path spacing and lengths, and receiver line spacing and lengths, to optimize particular economic, operational, or survey robustness factors for the desired survey.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method for conducting a marine seismic survey, comprising the steps of:
   deploying a plurality of receivers at selected locations in a marine survey area, said locations selected so that the plurality of receivers are arranged in a plurality of substantially parallel lines; and
   activating a seismic source at a plurality of source locations along a plurality of paths in the marine survey area, each of said paths being substantially in a line which intersects the lines defined by said plurality of receivers, said plurality of source locations in said plurality of paths defining an area which extends substantially beyond the area defined by said plurality of receivers in both length and width;
   wherein each of said plurality of receivers are operable to record reflected vibrations generated by said seismic source in said activating step.

2. The method of claim 1, wherein said plurality of paths are substantially parallel to one another.

3. The method of claim 1, wherein each of said paths includes a plurality of tracks of source locations therein; and wherein the distance separating tracks within a path is substantially smaller than the distance between adjacent paths.

4. The method of claim 1, wherein the distance between adjacent lines of receivers is substantially greater than the distance between successive source locations within a path.

5. The method of claim 1, wherein each of said paths is substantially perpendicular to the lines of said plurality of receivers.

6. The method of claim 1, wherein said activating step comprises:
   towing a seismic source along said paths while periodically activating said source.

7. The method of claim 6, wherein said towing step comprises:
   traveling along a first portion of said path while activating said source a plurality of times; and
   then traveling along a second portion of said path, during which said source is not activated.

8. The method of claim 6, wherein said towing step comprises:
   towing and alternately activating first and second seismic sources along said path.

9. The method of claim 1, wherein said deploying step comprises:
   deploying first and second sets of receivers, each set arranged in a plurality of substantially parallel lines;
   and further comprising:
   enabling said first set of receivers to record reflected vibrations corresponding to said source activated at a first plurality of source locations; and
   enabling said second set of receivers to record reflected vibrations corresponding to said source activated at a second plurality of source locations.

10. A method of obtaining marine seismic data, comprising the steps of:
    placing a plurality of acoustic receivers in a survey area, said plurality of receivers arranged to define a plurality of substantially parallel lines, said parallel lines of receivers defining a receiver area, each of said acoustic receivers for detecting acoustic energy; and
    generating a plurality of acoustic shots for receipt by said plurality of acoustic receivers along a plurality of paths in said survey area, each of said paths intersecting each of the lines defined by said plurality of receivers;

and wherein the locations at which acoustic shots are generated along said plurality of paths define a shot area having both length and width substantially greater than the length and width of said receiver area.

11. The method of claim 10, wherein said plurality of paths are substantially parallel to one another.

12. The method of claim 10, wherein said generating step comprises:

periodically activating a marine seismic source.

13. The method of claim 10, wherein said generating step comprises:

towing a marine seismic source along a first portion of one of said paths while activating said source; and towing said source along a second portion of said one of said paths while not activating said source.

14. The method of claim 10, wherein said receivers are disposed on the seafloor.

15. The method of claim 10, wherein said receivers are deployed above the seafloor.

16. The method of claim 10, wherein said acoustic shots are generated at a depth less than that of said receivers.

17. The method of claim 16, wherein said path crosses over said receivers.

* * * * *